United States Patent Office 3,278,557
Patented Oct. 11, 1966

3,278,557
LACTONES FROM KETO ESTERS
Sheldon Chibnik, Plainfield, N.J., assignor to Mobil Oil Corporation, a corporation of New York
No Drawing. Filed July 17, 1963, Ser. No. 295,848
5 Claims. (Cl. 260—343.5)

This invention relates to the production of lactones from keto-substituted carboxylic acid esters and is more particularly concerned with the formation of delta-lactones from such esters by hydrogenation thereof under selected conditions.

Many methods have been proposed for the production of the several types of lactones with varying degrees of success. It is especially desirable to utilize a process which is simple, economical and in which the starting materials are readily obtainable. The delta lactones are commercially useful materials and when obtainable with various side-chains or substituent groups, these lactones are important intermediates in diverse organic reactions.

It is the principal object of this invention to provide a simple and easily controlled process for the production of delta-lactones. It is another object to provide such a process wherein exceptionally stable delta-lactones are formed. It is yet another object to use readily obtainable delta-keto esters as the starting materials. It is still another object to produce delta lactones having few or many and varied substituent groups by means of the same economical process. It is a further object to provide such a process as will avoid formation of undesirable by-products. It is still another object to provide such a process which will give a reaction sufficiently rapid to permit continuous operation. These and other objects and advantages of the invention will become apparent to those skilled in the art, from the more detailed description and examples set forth hereinafter.

I have discovered that delta-lactones may be readily and simply prepared by hydrogenation, in the presence of a suitable hydrogenation catalyst, of an ester of a simple or highly-substituted delta-keto carboxylic acid. The reaction may be generically illustrated by the following equation:

$$R-\underset{\underset{H_{2-n}}{|}}{\overset{\overset{O}{\|}}{C}}-\underset{\underset{R_2}{|}}{\overset{\overset{R_1}{|}}{C}}(-CH-\underset{\underset{R_3}{|}}{CH}-CO_2R_4)_n \xrightarrow[\text{catalyst}]{H_2}$$

$$R-CH\underset{R_1-\underset{\underset{H_{2-n}}{|}}{C}-\underset{\underset{R_2}{|}}{CH}-R_2}{\overset{O-C}{\diagdown}}CH-R_3 \quad (-CH-CH-CO_2R_4)_{n-1}$$

in which:
R=H, alkyl, aryl
$R_1$=H, $CH_3$, $C_2H_5$
$R_2$= alkyl (1–8 C)
$R_3$=H, $CH_3$, $C_2H_5$
$R_4$=any alcohol group normally forming an ester
n=1 or 2

The selected keto-ester is heated in a suitable pressure vessel with hydrogen and a suitable hydrogenation catalyst which promotes conversion of =C=O to =CHOH. The reaction may be conducted as a batch process in an autoclave or in a continuous manner. The reaction may be conducted in a suitable solvent, in which case the catalyst may be separated by filtration from the product solution and the product recovered by distillation.

The following are more specific examples of my process wherein and otherwise throughout the specification, parts and percentages are by weight:

*Example 1*

A suitable stirred autoclave charged with 506 parts diethyl 4-benzoylpimelate, 323 parts methanol and 50 parts copper chromite, was heated to 240° F. under a hydrogen pressure of 875 p.s.i. The reaction was complete in twenty minutes, as evidenced by no further pressure drop. The liquid was separated by filtration, stripped of solvent and purified by distillation under reduced pressure. The product so obtained (I) is 4-(2-carbethoxyethyl)-5-phenyl-5-hydroxyvaleric acid lactone. It boils at 110° C. at 0.01 mm. absolute pressure, has a $n_D^{25}$ value of 1.4987, and contains 69.49% carbon (69.54% theoretical) and 7.70% hydrogen (7.30% theoretical). The reaction proceeded in accordance with the following:

$$\phi CO-CH-(CH_2CH_2CO_2C_2H_5)_2 \xrightarrow[\text{catalyst}]{H_2}$$

$$\phi-\underset{\underset{\underset{O}{\|}}{\underset{C}{\diagdown}}{\overset{5}{\diagup}}}{CH}-\underset{\underset{\underset{2}{\diagup}}{CH_2}}{\overset{4}{CH}}-CH_2CH_2CO_2C_2H_5 \quad (I)$$

Similarly, other delta lactones may be prepared using the procedure of Example 1 or of the modifications thereof described herein. The following are typical of the esters which may be used to produce the lactones noted:

$$CH_3CO(CH_2)_3CO_2Et \longrightarrow CH_3\overset{\overset{O\text{---}\text{---}\text{---}}{|}}{CH}-(CH_2)_3\overset{|}{C}=O$$
ethyl 4-acetylbutyrate  δ-caprolactone $$CH_3CO\underset{\underset{CH_3}{|}}{C}(CH_2CH_2CO_2Et)_2 \longrightarrow CH_3CH-\underset{\underset{\underset{O}{\|}}{\underset{C}{\diagdown}}}{\overset{\overset{CH_3}{|}}{C}}-CH_2CH_2CO_2Et$$

$$OCHCH_2CH_2CH_2CH_2CO_2CH_3 \longrightarrow \underset{\underset{\underset{O}{\|}}{\underset{C}{\diagdown}}}{\overset{\overset{CH_2-CH_2}{\diagup}}{O}}\overset{CH_2}{\underset{CH_2}{\diagdown}}$$

(Ester) ⟶ (δ Lactone)

| Ester | Lactone |
|---|---|
| Ethyl 4-benzoyl butyrate | 5-phenyl-5 hydroxy valeric acid lactone. |
| Methyl 4-benzoyl valerate | 4 methyl-5 phenyl-5 hydroxy valeric acid lactone. |
| Methyl 4-benzoyl-2 methyl valerate | 2,4 dimethyl-5-phenyl-5 hydroxy valeric acid lactone. |
| Dimethyl-2,6 dimethyl-4-benzoyl pimelate. | 4-(2-carbomethoxypropyl)-5-phenyl 5-hydroxy valeric acid lactone. |

The various hydrogenation catalysts available for use in my process are those which promote conversion of =C=O to =CHOH, as is well known in the art. In place of the copper chromite of Example 1, one may use other available chromites and nickel compounds (e.g., Raney nickel, nickel alloys) metals of groups 6 and 8 of the periodic tables (e.g. Co, Mo, etc.), their oxides and sulfides, with and without inert supporting carriers, etc. The amounts of catalyst may be varied widely.

With catalysts of the types shown, the reaction conditions may also be varied widely. For best control of the reaction and for most rapid results, a temperature range of about 210° F. to about 450° F. and pressures of about 750 p.s.i. to about 1500 p.s.i. are generally preferred. The type of apparatus used is not critical but from the rapid rate of reaction, it is obvious that suitable pressure tubing can be provided to permit sufficient time under the desired conditions of temperature and pressure to permit continuous operation of the process, if desired.

At lower temperatures and pressures, the process is also operative but at a slower rate as follows:

*Example 2*

A mixture of 32 parts (0.1 mol.) diethyl 4-benzoylpimelate, 0.6 part 5% palladium on alumina and 150 parts ethanol was agitated for 21 hours at 115° F. under an initial hydrogen pressure of 60.5 p.s.i. The total absorption of hydrogen was equal to the 0.1 mol. calculated for lactone formation. The lactone was recovered as in Example 1 and was identified as being the same lactone as in that example.

The various lactones made in accordance with the present invention have considerable commercial utility as monomers, chemical intermediates, perfume bases and the like. These lactones can be used to modify various polymers containing acid, hydroxy, amino or similar groups which are reactive with lactones. The lactone ring can be opened by these groups to give a propagating moiety.

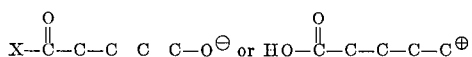

which can react further with other lactone molecules to graft a polyester segment onto a preformed polymer or to crosslink the polymer. For example, an epoxy resin

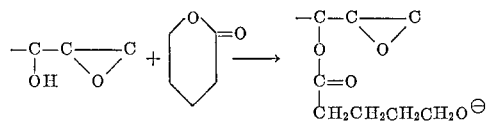

The reactive end can then attack the epoxy group of another chain and crosslink the system. Similar type reactions can take place with urea-formaldehyde, phenol-formaldehyde, melamine-formaldehyde, polyvinyl alcohol, etc.

The lactones may also be used as modifying agents in alkyd or polyester formation,

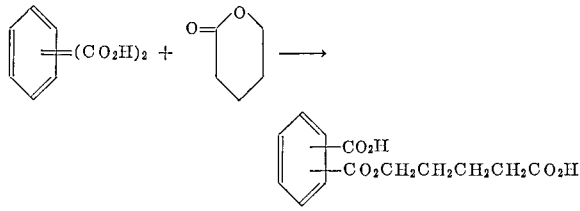

A straight chain dibasic acid is initially formed which can then react with the polyol present to form a polyester with altered properties; the long straight chain adds flexibility. Naturally, the lactones can also be used to form polyesters by themselves. From these reactions, it has been noted that the aryl substituted lactones are more stable than the similarly alkyl substituted lactones and for many purposes, the former are preferred.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A process for producing delta-lactones which comprises contacting an ester selected from the group consisting of methyl and ethyl esters of delta keto-delta phenyl alkane carboxylic acids, and hydrogen, with a hydrogenation catalyst which promotes conversion of =C=O to —CHOH, at a temperature of between about 210° F. and about 450° F., and at a pressure of between about 750 p.s.i. and about 1500 p.s.i.

2. The process defined in claim 1, wherein in said hydrogenation catalyst is copper chromite.

3. A process for producing 4-(2-carbethoxyethyl)-5-phenyl-5-hydroxyvaleric acid lactone that comprises contacting diethyl 4-benzoylpimelate and hydrogen with copper chromite, at a temperature of between about 210° F. and about 450° F., and at a pressure of between about 750 p.s.i. and about 1500 p.s.i.

4. A delta lactone having the formula:

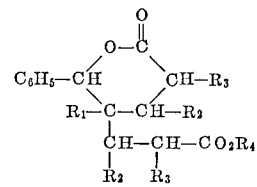

wherein $R_1$, $R_2$, and $R_3$ are selected from the group consisting of H and $CH_3$, and $R_4$ is selected from the group consisting of $CH_3$ and $C_2H_5$.

5. 4-(2-carbethoxyethyl)-5-phenyl-5-hydroxyvaleric acid lactone.

References Cited by the Examiner

UNITED STATES PATENTS

| | | | |
|---|---|---|---|
| 2,786,852 | 3/1957 | Dunlop et al. | 260—343.6 |
| 2,867,628 | 1/1959 | Cass | 260—343.6 |
| 3,113,138 | 12/1963 | Franko-Filipasic | 260—343.6 |

OTHER REFERENCES

Beilstein, Organische Chemie, vol. 17, original work (1933), page 322.

Beilstein, Organische Chemie, vol. 17, 2nd supplement, page 346 (1952).

Jacobs et al., Chemical Abstracts, vol. 26, (1932), page 86.

Reid et al., Chemical Abstracts, vol. 46 (1952), page 9516.

Richter's Organic Chemistry, vol. IV (1947) page 4.

WALTER A. MODANCE, *Primary Examiner.*

NICHOLAS S. RIZZO, *Examiner.*

J. A. PATTEN, *Assistant Examiner.*